Aug. 22, 1967   J. F. GIBBONS ET AL   3,337,793
VOLTAGE REGULATOR UTILIZING GOLD DOPED SILICON
Filed Nov. 2, 1964

INVENTORS
JAMES F. GIBBONS
V.G.K. REDDI
BY
*Paul M. Klein Jr.*
ATTORNEY

United States Patent Office 3,337,793
Patented Aug. 22, 1967

3,337,793
VOLTAGE REGULATOR UTILIZING GOLD DOPED SILICON
James F. Gibbons, Palo Alto, and V. G. K. Reddi, San Mateo, Calif., assignors, by mesne assignments, to the United States of America as represented by the Secretary of the Navy
Filed Nov. 2, 1964, Ser. No. 408,437
5 Claims. (Cl. 323—66)

This invention relates to a method and apparatus for regulating voltage. More particularly, the invention relates to a voltage regulating method and apparatus which make novel use of a solid-state device.

It is well known that, in electrical systems comprising a generator or power supply and a load connected thereto, it is often essential to maintain a constant voltage across the load during varying values of load current or changes of other conditions which would tend to vary the voltage across the load. In order to accomplish the desired voltage regulation, i.e., the maintenance of a constant voltage across the load in the face of changing conditions, various methods of operating such electrical systems have been used. Circuits have been used which include some type of voltage regulating device usually connected between the power supply and the load.

It is an object of this invention to provide an apparatus and a method for producing a regulated voltage which embody the use of a solid-state device as simple as a resistor and yet capable of controlling the limiting voltage merely by varying the thickness of the device.

Other objects, advantages and novel features of the invention will become apparent from the following detailed description when considered in conjunction with the accompanying drawings wherein.

This invention is based on the discovery that silicon which is uniformly doped with a carrier-producing material and is also uniformly doped with gold in an amount sufficient to render the silicon essentially intrinsic exhibits the phenomenon of electrical breakdown characterized by a steep rise in current at some critical electrical field. Such a characteristic makes it possible to use this uniformly gold-doped silicon as a voltage regulating element.

Figure 1:
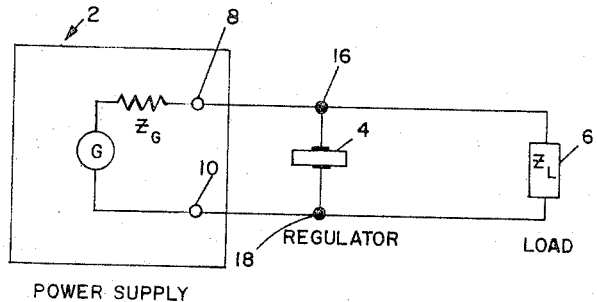
FIG. 1 is a schematic representation of an electrical system which comprises a voltage regulator.

Reference is now made to the drawing. In FIG. 1 there is shown a power supply 2 interconnected with a voltage regulator 4 of the type comprehended by this invention, and a load 6. Power supply 2 is schematically represented as comprising a voltage generator G in series with an internal or dropping impedance $Z_G$, the output voltage of which appears across terminals 8 and 10. The output voltage is equal to the electromotive force of the generator G minus the voltage drop across the internal impedance $Z_G$ due to the current flowing through it. The load 6 is represented schematically by an impedance $Z_L$ connected to the output terminals of the power supply. The regulator 4 is represented as a device connected in parallel with the load impedance. Essentially, in such a system the voltage regulator 4 must maintain constant voltage across the load 6, regardless of variations in current flowing through the load 6 or changes in the power supply electromotive force. The voltage regulator limits the voltage to the maximum desired voltage.

Figure 2:
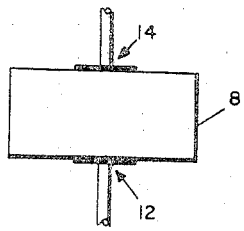
FIG. 2 is a schematic representation of the solid-state device used in the method and apparatus of the invention and designated as regulator in FIG. 1.

The element 4 of the embodiment of the apparatus of the invention shown in FIG. 1 is illustrated to an enlarged scale in FIG. 2. This element is made of a piece of silicon, either n-type or p-type, which has been uniformly doped with gold sufficient to render the silicon essentially intrinsic. One suitable method of making this element is the following. There are commonly available n-type and p-type silicon crystals which are conventionally used as semiconductors. These crystals contain, uniformly distributed throughout them, some type of impurity which makes them n-type or p-type. Typically, for example, n-type silicon may contain antimony or a similar substance, and p-type silicon may contain gallium or a similar substance. To make the element of FIG. 2, a wafer 8 is cut from such a crystal and lapped from both sides to the desired thickness, which will be hereinafter explained. To obtain a uniform distribution of gold throughout the wafer, the wafer is first etched to give shiny surfaces. A 9:1 nitric and hydrofluoric acid system is suitable for this purpose and accomplishes the etching in a few minutes. A layer of high purity gold perhaps 5,000 A. thick is evaporated on both sides of the wafer in a high vacuum system. Just before evaporation the wafer is dipped in hydrofluoric acid and rinsed with methanol to produce an oxide-free surface.

To accomplish diffusion of the gold throughout the wafer, the wafer is placed in an open quartz-tube furnace and maintained at an elevated temperature in a suitable atmosphere for a long enough time to achieve uniform diffusion. A suitable atmosphere is, for example, 95% $N_2$–5% $O_2$ flowing through the furnace. With a wafer thickness of about 0.016″ and a temperature of 1015° C. satisfactory diffusion is accomplished in 28 to 30 hours. With a wafer of about 0.018″ maintained at 1200° C. diffusion is accomplished in about 6 hours. With such times and temperatures, the density of the gold reaches at least about 90% of the maximum solid solubility.

After the aforedescribed heat treatment, the wafer is removed from the furnace and allowed to cool in air. Care is taken to insure minimum out diffusion during cooling. This can be accomplished, for example, by laying the sample in a low-thermal-mass quartz holder. The time required to cool to approximately room temperature is less than 30 seconds.

After diffusion, the wafer is cleaned to remove all visible gold on the surfaces. This can be accomplished, for example, by washing the wafer alternately in aqua regia and hydrofluoric acid. The wafer is then lapped from both sides to the desired thickness. Ohmic contacts represented schematically at 12 and 14 are prepared by any standard well known method. A suitable method, for example, is the evaporation and alloying technique described by J. M. Goldey in "Transistor Technology," edited by F. J. Biondi, chapter 7, vol. 3, 1953, and published by D. Van Nostrand Company, Inc. For this process, the lapped wafer is dipped in hydrofluoric acid rinsed with methanol and then heated in a vacuum chamber to 390° C. on a flat carbon strip. If the starting material was n-type silicon containing antimony, gold-antimony (99%–1%) is evaporated to give approximately a 3,000 A. evaporated layer. Similarly, if the starting material was p-type silicon containing gallium, for example, then gold-gallium (99%–1%) is evaporated on to the wafer. For making external electrical connections to these ohmic contacts, any desired conventional technique can be used. For example, probes or pressure contacts can be pressed against the alloy surface, or the wafer can be attached by silver paste or soldered to conductors adapted for electrical connection to the junctions 16, 18.

Typically, for example, an n-type starting material might have a room-temperature resistivity in the range of from about a little over .1 ohm-cm. to something over 6 ohm-cm. with a density of donor impurity atoms in the range of from something over $10^{14}$ to something over $10^{16}$ per cc. After diffusion of gold, the resistivity ranges from somewhat over $10^3$ to somewhat over $10^5$ ohm-cm. The gold uniformly diffused throughout the silicon, according to the invention, should be in an amount sufficient to render the silicon nearly or essentially intrinsic. That is, the free carrier density of initially high conductivity silicon is reduced by the introducton of gold to nearly intrinsic values. The term intrinsic is here used with the significance customary in the field of solid-state physics where an intrinsic semiconductor is defined as a material which is naturally semiconducting, in the form of its pure, ideal crystal, even when entirely free of impurities. Increase in resistivity accomplished by the doping of the silicon with gold is occasioned by the gold compensating for the impurity such as antimony or gallium. One example of a typical gold-diffused, n-type silicon of this invention has about $2.12 \times 10^{15}$ atoms per cc. of donor impurity and $9 \times 10^{15}$ or $10^{16}$ atoms of gold per cc.

Figure 3:
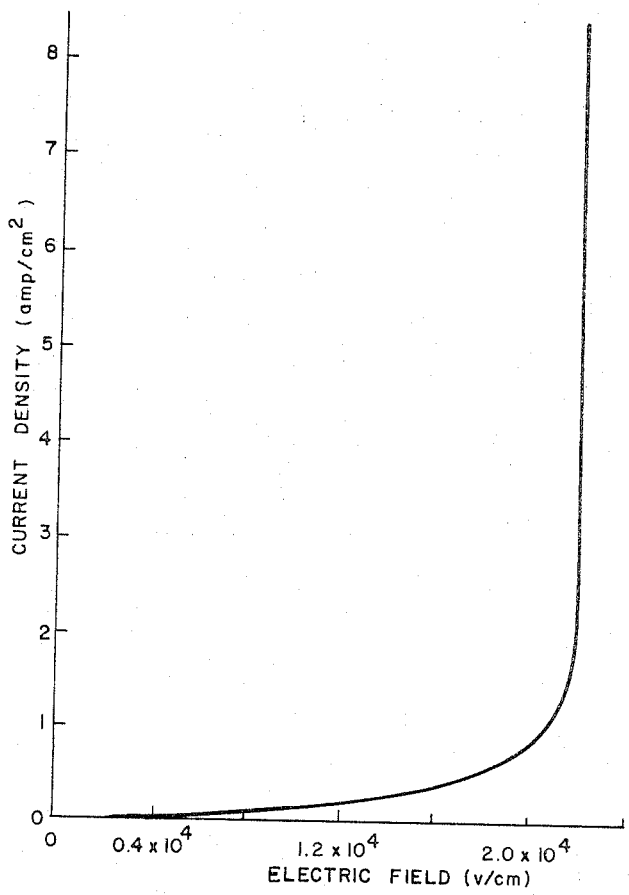
FIG. 3 is a graph showing the voltage-current characteristic of a typical embodiment of the solid-state device of FIG. 2 using a plot of current density vs. electric field.

As previously indicated, the operation of this invention is based upon the remarkable discovery that, at certain critical value of electric field, the aforedescribed uniformly gold-doped silicon exhibits electrical breakdown. A typical sample whose voltage current characteristic is illustrated in FIG. 3 exhibits electrical breakdown with a steep rise in current at a critical field of about $2.2 \times 10^4$ volts per cm. The critical voltage across the sample is then simply $V = sF_b$ where $s$ is the distance, measured along the direction of the electric field in the body between the points of ohmic contact, and $F_b$ is the critical field which is an inherent characteristic of the particular embodiment easily determinable by measurement. When the gold-doped silicon body is in the form of a simple wafer, as illustrated in FIG. 2, the distance $s$ is essentially merely the thickness of the wafer. Once the voltage desired to be maintained is selected, it suffices to cut off a piece of gold-doped silicon of the thickness given by the aforementioned equation. For example, if a particular gold-doped silicon exhibits a breakdown field $F_b = 2.0 \times 10^4$ volts per cm. and it is desired to maintain a voltage regulated at 2,000 volts, it suffices to make the regulating element of FIG. 2 $\frac{1}{10}$ cm. thick.

The apparatus of the invention is made by placing in parallel with the load across the output of the power supply the aforedescribed uniformly gold-doped silicon cut to the proper thickness determined by the aforementioned equation.

The method of the invention of producing a regulated voltage across a pair of terminals is accomplished by inserting the aforedescribed uniformly gold-doped silicon across the terminals and applying a voltage from the power supply to the silicon sufficient to cause electrical breakdown in the silicon.

It is thus seen that the method and apparatus of the invention provide for producing a regulated voltage in a simple manner with simple equipment. The magnitude of the regulated voltage is easily varied by simply varying the thickness of the gold-doped silicon, that is, the distance between the ohmic contacts measured along the direction of the electric field in the body between the points of contact so that in effect voltage regulation can be accomplished at any desired voltage by cutting off the right length of material as easily as buying a piece of sausage. There are no semiconductor junctions in the element 4—merely the aforedescribed simple ohmic contacts applied to the two ends. The device exhibits symmetrical voltage regulator characteristics, i.e., it will not pass any current until a certain voltage is applied. It passes essentially no current until a certain voltage is applied and then it passes any current required by the circuit without further increase in voltage. The voltage at which the device regulates is a function of the doping concentrations and, as previously indicated, the distance between the points of ohmic contact measured along the direction of the electric field between them through the body. This distince is essentially the length of the piece of silicon cut from an original crystal or the thickness of the wafer thus formed.

Obviously many modifications and variations of the present invention are possible in the light of the above teachings. It is therefore to be understood that within the scope of the appended claims the invention may be practiced otherwise than as specifically described.

What is claimed is:

1. An apparatus for producing a regulated voltage, V, across a pair of terminals adapted to supply power to a load, said apparatus comprising
    a source of electromotive force connected through a series dropping impedance to said terminals and producing at said terminals an electromotive force at least as high as V; and
    a body of silicon electrically connected across said terminals,
        said body being uniformly doped with a carrier-producing material and being also uniformly doped with gold in an amount sufficient to render said silicon essentially intrinsic, whereby said uniformly doped silicon will undergo electrical breakdown at voltage V, the breakdown voltage being a function of gold doping concentration and thickness of the silicon body along the direction of electric field.

2. The apparatus of claim 1 wherein the electrical connections to said body of silicon contact said body at locations on said body separated by a distance $s$, measured along the direction of the electric field in said body between said points of contact, related to the voltage V by the following formula:

$$V = sF_b$$

where $F_b$ is an inherent property, the breakdown field, of said body of silicon whereby because of said relation, voltage regulation can be accomplished at any desired voltage by cutting off a corresponding length of the uniformly doped silicon body.

3. A voltage regulator comprising:
    a body of silicon;
    said body being uniformly doped with a carrier producing material;
    said body being additionally uniformly doped with gold in an amount sufficient to render the silicon essentially intrinsic; and
    the gold doping having substantially no out-diffusion from said body of silicon,
    whereby said uniformly doped silicon body can exhibit a greatly increased current passing ability at a desired voltage which is to be maintained across said body.

4. A voltage regulator as claimed in claim 3 wherein the thickness $s$, of the voltage regulating body of silicon measured along the direction of the electric field is related to the desired voltage V, by the following formula $$s = \frac{V}{F_b}$$

where $F_b$ is an inherent property, the breakdown field, of the silicon body.

5. A voltage regulator as claimed in claim 4 wherein: $F_b$ is a function of the gold doping concentration within the silicon body.

References Cited

UNITED STATES PATENTS

| | | | |
|---|---|---|---|
| 1,850,587 | 3/1932 | Joffe | 323—94 X |
| 2,860,219 | 11/1958 | Taft et al. | 338—25 X |
| 2,965,519 | 12/1960 | Christensen | 317—240 X |
| 3,064,132 | 11/1962 | Strull | 317—240 X |
| 3,132,408 | 5/1964 | Pell. | |
| 3,200,329 | 8/1965 | Haisty | 323—94 |

JOHN F. COUCH, *Primary Examiner.*

A. D. PELLINEN, *Assistant Examiner.*